Patented July 16, 1940

2,207,991

UNITED STATES PATENT OFFICE 2,207,991

PREPARATION OF ESTERS OF 2-KETO-ALDONIC ACIDS BY OXIDATION OF ALDONIC ACIDS, THEIR LACTONES AND ESTERS

Richard Pasternack, Brooklyn, N. Y., and Peter P. Regna, North Bergen, N. J., assignors to Charles Pfizer & Company, Brooklyn, N. Y., a corporation of New Jersey No Drawing. Application August 5, 1939, Serial No. 288,570

6 Claims. (Cl. 260—483)

The object of this invention is the preparation of esters of 2-keto-aldonic acids from the corresponding aldonic acids, their lactones and esters by catalyzed chemical oxidation in substantially non-aqueous solvents consisting of the lower alcohols.

It is known to prepare 2-keto-gluconic acid from gluconic acid by means of an oxidative fermentation (Bernhauer and Görlich, Biochem. Z. 280: 367–721, 1935). However, the action of the microorganisms employed appears to be specific, and there is no evidence that this method is applicable to other aldonic acids. In so far as we have been able to determine, there is no record of the production of any 2-keto-aldonic acid in any substantially non-aqueous solvent. Since the molecule of an aldonic acid contains many points of attack, it is obvious that chemical agents must be highly selective in their action if they are to dehydrogenate only the second carbon atom.

It is disclosed in our copending application Serial No. 247,644, filed December 24, 1938 (now Patent No. 2,188,777), that chlorates acting upon aldonates dissolved in a mildly acid aqueous medium in the presence of a vanadium compound as catalyst, will produce the desired result, but that if the free aldonic acids are used, the reaction in aqueous medium is not satisfactory. Esters and lactones in water obviously are likewise unsuitable since they soon give the acid by hydrolysis.

We have now found that when an aldonic acid, or a lactone or ester of an aldonic acid is treated with a substantially non-aqueous lower alcohol, such as methanol or ethanol, and a chlorate in the presence of a small amount of a vanadium catalyst, such as vanadium pentoxide, dehydrogenation of the second carbon atom takes place and the ester of the corresponding 2-keto-aldonic acid is obtained in good yield. Vanadium compounds of lower states of oxidation may be used if desired, since the oxidizing action of the chlorate immediately converts them to the pentavalent state. It is advantageous to add a small amount of a mineral acid, such as phosphoric acid or sulfuric acid, to promote both esterification and oxidation. The amount of acidifying agent is preferably only a small fraction of the amount of aldonic acid present.

Our dehydrogenation process is applicable to the aldonic acids, their lactones and esters, in general, and in fact has been successfully applied not only to those containing six carbon atoms, but also to aldonic acids of five and seven carbon atoms, respectively. A particular advantage of our process is that the esters can be readily isolated by crystallization without preliminary removal of the added mineral acid and the dissolved catalyst.

When methyl alcohol is used as the organic solvent, a sufficient amount of the vanadium catalyst dissolves to permit observation of the completion of the action by the change from yellow to the blue of the vanadyl compounds. When higher alcohols are used, the vanadium catalyst is so nearly insoluble that the color change is not readily recognizable, but the process is still operative, although more slowly.

The temperature of the reaction is limited only by practical considerations of economical operation. The dehydrogenation proceeds satisfactorily at the boiling point of the solvent, but we prefer to work at room temperature, since the results are in every case at least as good as at higher or lower temperatures.

*Example 1.*—Preparation of the methyl ester of 2-keto-gluconic acid from d-glucono-γ-lactone. 17.8 grams of glucono-γ-lactone was refluxed in 100 cc. of 99.9% methyl alcohol, in the presence of 1 cc. 85% phosphoric acid until solution was effected. After dissolving 3.7 grams of sodium chlorate in the clear solution, the mixture was allowed to cool. Two grams of vanadium pentoxide was then added and the mixture was shaken for about four days at room temperature. Completion of the oxidative process was evidenced by the color change from yellow to the green-blue of the vanadyl ion. The unreacted solid catalyst was removed by filtration.

The filtrate was concentrated under diminished pressure and inoculated with crystals of 2-keto-d-gluconic methyl ester. The crystalline ester, contaminated with a little sodium chloride, was separated by filtration. A recrystallization from dioxan deposited pure 2-keto-d-gluconic methyl ester. The melting point 173–175° C. and rotation $$(\alpha)_D^{20} = -76.8°$$

in water (c, 2.8) agrees with the values given by Ohle (Ber. vol. 63, p. 849 (1930)).

To measure the 2-keto acid produced, an aliquot portion of the original filtrate was treated with sufficient calcium ferrocyanide to precipitate the vanadyl ion. After removal of the latter precipitate, the keto acid was determined by the usual procedure using Fehling's reduction. It indicated a 55% yield as 2-keto acid.

*Example 2.*—Preparation of the methyl ester of 2-keto-gluconic acid from d-glucono-δ-lactone. 36 grams of d-glucono-δ-lactone was dissolved in 200 cc. methyl alcohol by refluxing in the presence of 2 cc. of 85% phosphoric acid. To this solution was added 7.2 grams of sodium chlorate and 2 grams of vanadium pentoxide, and the mixture was shaken at room temperature for about five days until the oxidation was completed. The product was assayed as in Example 1 and showed a 60% yield of 2-keto-gluconic methyl ester. The oxidized solution was filtered and evaporated under reduced pressure and the ester allowed to crystallize. The crystalline 2-keto-gluconic methyl ester was recrystallized from dioxan to remove a little sodium chloride. The melting point was then 174–175° C. and the equilibrium $$(\alpha)_D^{20}$$

in water (c, 2.8) was $-76.8°$.

When practically all the ester was crystallized from the reaction mixture, the solution was hydrolyzed with water and then treated with calcium carbonate. The calcium phosphate was separated by filtration and a substantial quantity of the unreacted gluconic acid was recovered in the form of its calcium salt.

Example 3.—Oxidation of l-idonic acid to the methyl ester of 2-keto-l-idonic acid. A solution of 19.6 grams of idonic acid in methyl alcohol containing 2 cc. of 85% phosphoric acid was treated with 3.6 grams of sodium chlorate and 2 grams of vanadium pentoxide. The mixture was shaken at room temperature for about a week when the reaction was completed. An anaylsis by Fehling's reduction indicated a 50–60% yield of 2-keto-idonic acid. The catalyst was separated, and the reaction mixture evaporated to about 75 cc. under diminished pressure. A little ether was added to the concentrated alcoholic solution to facilitate crystallization of the 2-keto-idonic methyl ester. The latter was recrystallized from dioxan. The melting point 155–156° C. and the rotation $$(\alpha)_D^{20} = -25.5°$$

in methyl alcohol (c, 1) are in good agreement with the values given by Reichstein and Gruessner (Helv. Chim. Acta 17: 325).

Example 4.—The oxidation of l-gulono-lactone to the methyl ester of 2-keto-l-gulonic acid. 36 grams of l-gulono-lactone was suspended in 300 cc. of methyl alcohol containing 2 cc. of 85% phosphoric acid, 7.2 grams of sodium chlorate, and 2 grams of vanadium pentoxide. The mixture was shaken for several days and then filtered. 20 grams of the unreacted lactone was recovered along with the catalyst. The filtrate was evaporated to dryness and taken up with a little methyl alcohol, whereupon some of the sodium chloride was separated by filtration. The filtrate was then treated with a little ether to promote crystallization of the 2-keto-gulonic methyl ester. The crystalline ester was recrystallized from dioxan, and its melting point 154–156° C. and rotation $$(\alpha)_D^{20} = -25.5°$$

in methyl alcohol (c, 1) agree with the physical constants given for 2-keto-idonic in Example 3, and with those of Reichstein and Gruessner cited in Example 3.

Example 5.—The oxidation of l-idonic acid to the ethyl ester of 2-keto-l-idonic acid. A solution of 39 grams of idonic acid in absolute ethyl alcohol was treated with 2 cc. 85% phosphoric acid, 7.2 grams of sodium chlorate and 2 grams of vanadium pentoxide. This mixture was shaken for about eight days at room temperature. When the reaction was completed, the catalyst was removed by filtration and the filtrate analyzed by Fehling's reduction. The yield of 2-keto-idonic ester is 30%. When this same oxidation is performed in methyl alcohol, the yield is about twice as high.

Example 6.—Dehydrogenation of d-mannano-γ-lactone. 36 grams of d-mannano-γ-lactone was dissolved in 250 cc. methyl alcohol with 3 cc. 85% phosphoric acid and 7.2 grams of sodium chlorate under reflux. On cooling, some lactone crystallized; however, 2 grams of vanadium pentoxide was added and the suspension shaken for four days. When the reaction was completed the catalyst and some unreacted lactone were separated by filtration. A Fehling's reduction determination showed a 45% yield of 2-keto ester.

The filtrate was evaporated under diminished pressure and inoculated with 2-keto-gluconic methyl ester. The crystalline ester contaminated with a little sodium chloride was recrystallized from dioxan. Its physical constants are identical with those obtained from the oxidation of d-gluconic lactone as described in Examples 1 and 2.

Example 7.—The oxidation of d-glucono-δ-lactone to the ethyl ester of 2-keto-gluconic acid. 35.6 grams of glucono-δ-lactone was treated with 250 cc. absolute ethyl alcohol and 3 cc. of 85% phosphoric acid. This was refluxed until the lactone dissolved. The cooled solution was then treated with 7.2 grams of sodium chlorate and 2 grams of vanadium pentoxide. The reaction mixture was shaken for about seven days. In contrast to the oxidation in methyl alcohol, none of the catalyst dissolves when ethyl alcohol is the solvent. After removal of the solid catalyst, the filtrate was absolutely clear and colorless. An analysis by Fehling's reduction showed the yield to be about 35%.

The alcoholic solution was evaporated to dryness and then taken up with methyl alcohol and again evaporated to dryness. One per cent methyl alcoholic hydrochloric acid was added to the syrup and in this way the ethyl ester of the 2-keto acid was converted to the methyl ester. This crystalline ester was separated by adding a little ether and subsequently recrystallized from dioxan. Its values for the melting point and rotation are in agreement with those in Examples 1 and 2, and with those of Ohle cited in Example 1.

Example 8.—Oxidation of l-galactonic acid to the methyl ester of 2-keto-galactonic acid. A solution containing about 35 grams of l-galactonic acid in methyl alcohol was treated with 2 cc. of 85% phosphoric acid, 7.2 grams of sodium chlorate and 2 grams of vanadium pentoxide. The mixture was shaken for about three days, whereupon the catalyst was removed by filtration and the filtrate analyzed by Fehling's reduction. The yield of 2-keto acid was about 25%.

Example 9.—Dehydrogenation of glucono-δ-lactone to form the methyl ester of 2-keto-gluconic acid at elevated temperatures. 72 grams of glucono-δ-lactone was dissolved in 250 cc. of methyl alcohol and 3 cc. of 85% phosphoric acid on a reflux. When the lactone dissolved, 14.8 grams of sodium chlorate and 1 gram of vanadium pentoxide were added. After about two hours' heating at a boil under reflux, the color change indicated completion of the reaction, whereupon the catalyst was removed by filtration. The filtrate analyzed about 35–40% 2-keto acid. It was evaporated under diminished pressure and the 2-keto-gluconic methyl ester readily crystallized. The ester was recrystallized from dioxan, and the values for the physical constants are identical with those given in Examples 1 and 2.

The invention claimed is:

1. Process for preparing esters of 2-keto-aldonic acids which comprises treating a member selected from the group consisting of the aldonic acids, their lactones and esters with a substantially non-aqueous lower alcohol containing a minor amount of a nonoxidizable acid selected from the group consisting of phosphoric acid and sulfuric acid and a chlorate in the presence of a vanadium catalyst.

2. Process for preparing esters of 2-keto-aldonic acids which comprises treating a member selected from the group consisting of the aldonic acids, their lactones and esters with a substantially non-aqueous lower alcohol containing a minor amount of phosphoric acid and a chlorate in the presence of vanadium pentoxide as catalyst.

3. Process for preparing esters of 2-keto-aldonic acids which comprises selectively dehydrogenating the second carbon atom of a substance selected from the group consisting of aldonic acids, their lactones and esters, by subjecting said substance to the action of a chlorate and a vanadium catalyst in a lower alcohol containing a minor amount of a nonoxidizable acid selected from the group consisting of phosphoric acid and sulfuric acid.

4. Process for the preparation of esters of 2-keto-idonic acid by the dehydrogenating action of sodium chlorate and a vanadium catalyst upon idonic acid in a medium consisting of a lower alcohol acidified with a nonoxidizable acid selected from the group consisting of phosphoric acid and sulfuric acid.

5. Process for the preparation of esters of 2-keto-gluconic acid by the dehydrogenating action of sodium chlorate and a vanadium catalyst upon gluconic acid in a medium consisting of a lower alcohol acidified with a nonoxidizable acid selected from the group consisting of phosphoric acid and sulfuric acid.

6. Process for the preparation of esters of 2-keto-gulonic acid by the dehydrogenating action of sodium chlorate and a vanadium catalyst upon gulonic acid in a medium consisting of a lower alcohol acidified with a nonoxidizable acid selected from the group consisting of phosphoric acid and sulfuric acid.

RICHARD PASTERNACK.
PETER P. REGNA.